United States Patent [19]

Wieland

[11] Patent Number: 4,827,626
[45] Date of Patent: May 9, 1989

[54] METHOD AND APPARATUS FOR REGISTER CORRECTION

[75] Inventor: Erich G. Wieland, Wurzburg, Fed. Rep. of Germany

[73] Assignee: Koenig & Bauer Aktiengesellschaft, Wurzburg, Fed. Rep. of Germany

[21] Appl. No.: 41,027

[22] Filed: Apr. 21, 1987

[30] Foreign Application Priority Data

Apr. 30, 1986 [DE] Fed. Rep. of Germany ....... 3614578

[51] Int. Cl.$^4$ .................. G01B 21/04; B41F 33/00
[52] U.S. Cl. ........................................ 33/614; 33/620
[58] Field of Search ............... 33/614, 620, 621, 623, 33/615, 616, 617, 618, 619

[56] References Cited

FOREIGN PATENT DOCUMENTS 2939388 4/1980 Fed. Rep. of Germany .

OTHER PUBLICATIONS

Dai Nippon Printing Company, Ltd., Telecursor.

Primary Examiner—William D. Martin, Jr.
Attorney, Agent, or Firm—Jones, Tullar & Cooper

[57] ABSTRACT

A method and apparatus for measuring and correcting register errors in multi-color printing machines is disclosed. A multi-color sheet that has been printed having register marks for each color is placed on a measuring table. The approximate locations of the register pairs and the accurate spacings of the individual register marks in each pair are determined by a light stylus, an electronic color video measuring camera system or on a measuring table having a digitizer surface. The values are entered into a computer which calculates the corrective values to be used to relocate one or more of the printing plates carried by each plate cylinder to achieve color registry in multi-color printing.

7 Claims, 4 Drawing Sheets

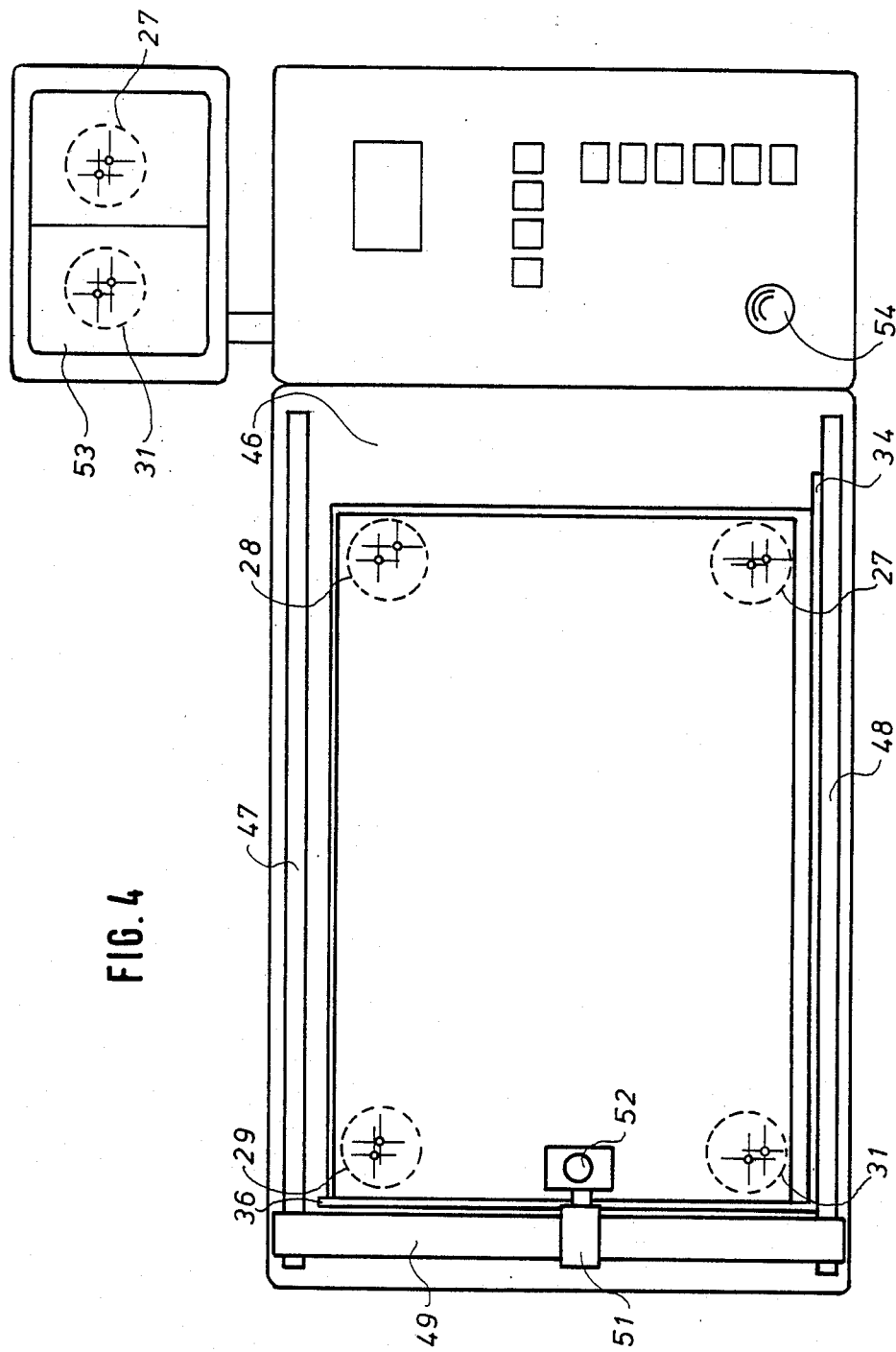

METHOD AND APPARATUS FOR REGISTER CORRECTION

FIELD OF THE INVENTION

The present invention is directed generally to a register system for a rotary printing machine. More particularly, the present invention is directed to a method and apparatus for measuring register errors in a printing machine. Most specifically, the present invention is directed to a method and apparatus for measuring register errors in a multi-color rotary printing machine. The positions of one or more groups of register marks on a printed sheet that has been printed in multiple colors are determined. Differences in the portions of individual register marks in each group of marks are also measured. These sets of data are then fed into a computer by one of several possible methods. This data is then utilized by the computer to generate information which will allow a press operator to adjust the location of individual color printing plates on the plate cylinder of the printing unit to correct registry errors caused by printing plate positional errors.

DESCRIPTION OF THE PRIOR ART

Devices for measuring and correcting multi-color register errors are generally known. A DAI NIPPON works publication entitled "TELECURSOR" discusses the display of register marks such as cross-type register marks of a multi-color print by means of a color television camera onto a color television screen. The register mark intersection points of the various colors, which are printed directly next to each other, are measured by means of a light stylus. The data thus received is transferred to a computer which evaluates this data and passes it on to a printing unit which then prints out the measured values. Off-line and on-line operation with the register adjustment device is possible. This type of device allows only register marks of varying colors lying directly next to each other to be evaluated and adjusted to each other. Furthermore, systems using light styluses often do not furnish sufficient data.

The position of register marks frequently does not, particularly with sheet-fed rotary printing machines, permit a conclusion to be reached with regards to the register quality of the individual colors. Negative and positive printing surfaces of different colors lying next to each other are frequently a far better gauge for measuring register quality than the position of the varying colored register marks in relation to one another. Multicolor images of clocks with a thin second hand are, for example, particularly troublesome. Also, the oblique positioning of one color to the next can only be measured with two register mark systems and the position of a second color in relation to the reference color compensated for by inclining the printing plate on the plate cylinder of the deviating color. Inclining of the printing plate of the deviating color or colors is time-consuming because the printer must determine this inclination empirically so that it is left up to his skill.

SUMMARY OF THE INVENTION

It is an object of the present invention to provide a register system for a rotary printing machine.

Another object of the current invention is to provide a method and apparatus for determining register errors in an accurate manner.

A further object of the present invention is to provide a method and apparatus with which register errors are accurately determined and directly passed to an evaluation logic system.

As will be discussed in detail in the description of the preferred embodiment as is set forth subsequently, the register system for a rotary printing machine in accordance with the present invention utilizes a printing plate or plates adjustably mounted to one or more plate cylinders. An initial position of each plate on each cylinder is measured and this data is stored in a computer's memory. A sheet is then printed in at least two colors using this printing press assembly. Each color plate has a plurality of spaced register marks that are also printed on the sheet. Once the sheet has been printed, it is placed on an evaluation surface that may be provided with a plurality of smaller evaluation fields. With the sheet on this evaluation surface, the positions of several spaced groups or pairs of register marks are determined and these values entered into the computer. Next the relative positions of each of the at least two register marks in each register pair are determined and these values are also entered in the computer. These values may then be used by the computer to calculate the amount by which the position of the second or subsequent color printing plate or plates are to be adjusted to achieve color registry between the plates.

One of the primary objects of the present invention is to provide a method wherein side, circumferential, roller setting, circumferential speed relation and width stretch errors are all measured extremely exactly in a simple way and adjustment values passed directly to one of the operators for correction. Alternatively, the determined values may be directly passed to an evaluation logic system which calculates the setting values necessary for correction and feeds them to the final control elements.

A significant advantage that may be achieved by the invention lies particularly in that make-ready time and paper wastage during registering can be considerably reduced. All register errors, namely side, circumferential, roller (oblique) setting errors, circumferential speed relation errors and width stretch errors to a reference color, such as black, can be displayed in enlarged form and measured. During off-line operation, the operating personnel can receive specific instructions, either by screen or print-out, as to what steps have to taken and where. Also, on-line or partial on-line operation is possible so that all corrections for which there are provided servo devices in the machine may be automatically introduced. For example, circumferential and side register servo motors can be present in the machine and these servo motors can be controlled while the plate oblique setting and plate stretching are carried out manually with the aid of the print.

Operating personnel can check the multi-colored sheet at the critical places, for example at the multi-colored position of negative to positive printed surfaces, and are no longer dependent on the evaluation of the position of the different colored register marks. The operating personnel are no longer dependent upon estimates and skill in order to align several printing plates to each other. The operating personnel can be given other values in order, for example, to stretch the printing plates in places.

BRIEF DESCRIPTION OF THE DRAWINGS

While the novel features of the register system for a rotary printing machine in accordance with the present invention are set forth with specificity in the appended claims, a full and complete understanding of the invention may be had by referring to the detailed description of preferred embodiments, as is set forth hereinafter, and as may be seen in the accompanying drawings in which:

FIG. 4 is a schematic view of a sheet rest and/or digitalization board and carrying a video camera and a screen.

DESCRIPTION OF THE PREFERRED EMBODIMENTS

Figure 1:
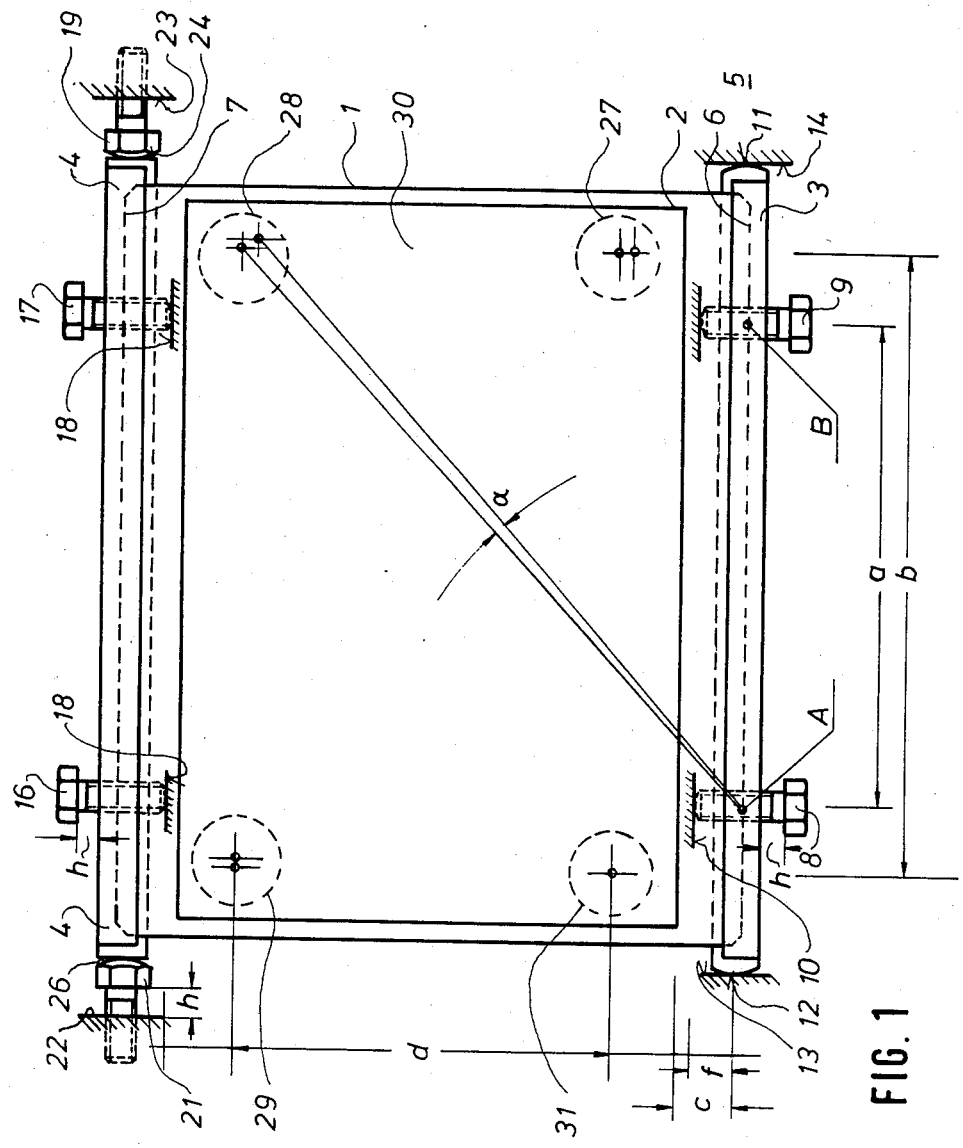
FIG. 1 is a schematic view of a printing plate having plate clamping and tensioning bars at its leading and trailing ends and further having adjustment means with the plate being supported in the body of the plate cylinder.

Turning initially to FIG. 1, there may be seen a plate cylinder 1 which carries a printing plate 2, such as an offset printing plate. Printing plate 2 is mounted to the plate cylinder 1 in a generally known manner. A groove 5 of the plate cylinder 1 carries a front one-piece clamping and tensioning bar 3 for receipt of a plate beginning end 6, and a lower, divided clamping and tensioning bar 4 for receipt of the plate end 7 of printing plate 2. The printing plate ends 6 and 7 are clamped by these bars. The front clamping and tensioning bar 3 is supported by adjustment means 8 and 9, for example adjusting screws, which are movable in their adjustment height "h" against a front surface 10 of groove 5. Both end surfaces 11 and 12 of the front clamping and tensioning bar 3 are convexly shaped and are supported against front side surfaces 13 and 14 of groove 5.

Rear end 7 of printing plate 2 is clamped in the rear clamping and tensioning bar 4. It is supported by means of at least two adjustment means 16 and 17, for example adjusting screws, which are movable in their adjustment height "h" against a rear surface 18 of groove 5. Both end surfaces 24 and 26 of the rear clamping and tensioning bar 4 are straight are supported against rear side surfaces 22 and 23 of the groove 5 by adjustment means 19 and 21 which are adjustable in height "h".

A printing surface 30 on the printing plate 2 has at least two paired register marks such as shown at 27, 28 29, 31 for two-color printing. The register marks 27, 28, 28, 31 can be register crosses, but may also be register lines belonging together for positive and negative printing surface.

Left and right turning poles of the front clamping and tensioning bar 3 and accordingly of the printing plate 2 or the plate's printing surface 30 respectively, are designated by A and B. A distance "c" in the Y-axis direction is the distance of the turning poles A and B from a printing surface starting line 32. This distance "c" is the starting point before every adjustment for elimination of register errors and is a value which is input into a computer memory as a fixed value. The turning poles A and B have a fixed spatial distance "a". The register mark pairs 27 and 31 or 28 and 29 respectively are at a distance "b" in the X-axis direction and the register mark pairs 27, 28 or 31, 29 respectively are at a distance "d" in the Y-axis direction from each other. The outer edge of the printing plate beginning 6 always lies on a same, exactly determined, horizontal line in the clamping and tensioning bar 3.

A distance "f" of the turning poles A and B at the starting point of the clamping and tensioning bar 3 from the front groove surface 10 is defined as fixed value. The measurements "a", "b", "c" and "d" are values specific to a particular machine and are stored separately for each machine in the memory of an electronic evaluation unit.

Figure 2:
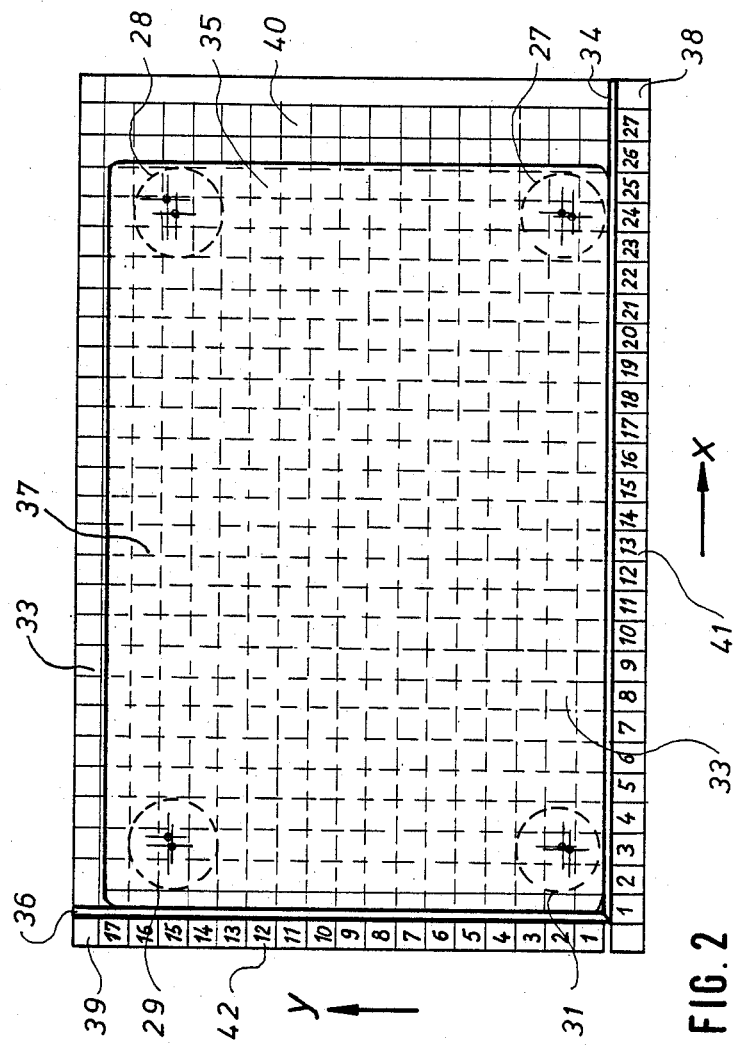
FIG. 2 is a schematic view of a measuring table in accordance with the present invention and provided with a coordinate grid.

Turning now to FIG. 2, there may be seen at 35 a sheet which has been printed with at least two colors by a rotary plate cylinder 1 carrying at least two printing plates 2 as described above. This printed sheet 35 is placed on an evaluation surface 33 and resting against a horizontal straight edge 34 secured to a desk and against a vertical straight edge 36 secured to a desk. The edges 34 and 36 lie at right angles to each other. The evaluation surface 33 is bordered to the left and bottom by the narrow straight edges 36 and 34 and is divided into individual square evaluation fields 37 which, for example, may measure 2 cm×2 cm. In order to be able to address each individual evaluation field 37, a horizontal coordinate X-bar 38 and a vertical coordinate Y-bar 39, each resting on the straight edges 34 and 36 on the outside, are secured to the measuring table 40. Each of the two bars 38 and 39 is provided with a scale 41 and 42 respectively both in the same measurement scale whose scale divisions are each consecutively numbered beginning with "1". In this way each evaluation field 37 can be identified by its X- and Y-axis position.

In order to evaluate the register errors, such as on a two-color printed sheet 35, the procedure is as follows: the sheet 35, with its printed surface facing upwards, is laid against the straight edges 34 and 36. It shows, for example, the register mark pairs 27 and 31, wherein the register marks depicted in a cross shape are representative of other relevant printed lines. The person carrying out the evaluation estimates the approximate X and Y position of the center of the register mark pairs 27 and 31 and enters their coordinate values into the computer. In the example shown according to FIG. 2, for example, for the register mark pair 27 the values are 24;2; and for the register mark pair 31 the values are 3;2. As is generally conventional, the first number is the X coordinate while the second of the pair is the Y coordinate.

The position of the two different color register marks in each of the register mark pairs 27 and 31 are then each measured with respect to each other by means of a generally known video camera measuring system such as, for example the DAI NIPPON "TELECURSOR", and these measured values are likewise entered into the computer either off-line or on-line and stored. Using the data established by the two preceding steps, the computer now calculates the nominal settings or positions into which the various adjustment means 8, 9, 16, 17, 19 or 21 for the printing plate 2 of the second color must be brought. In this way the position of the printing plate 2 for the second color on the plate cylinder 1 is correspondingly changed. The position of the printing plate 2 for the first color, the reference color, remains simply unchanged and in its nominal position. Through the steps just described, the printing plates are turned, or shifted, in relation to each other so that the smallest register error possible is achieved.

The adjustment means 8, 9, 16, 17, 19 and 21 can either be adjusted manually through the provision of corresponding scales and pointers on all adjustment means, or by means of electro-motorised, pneumatic, hydraulic, or electro-magnetic drives on-line.

Figure 3:
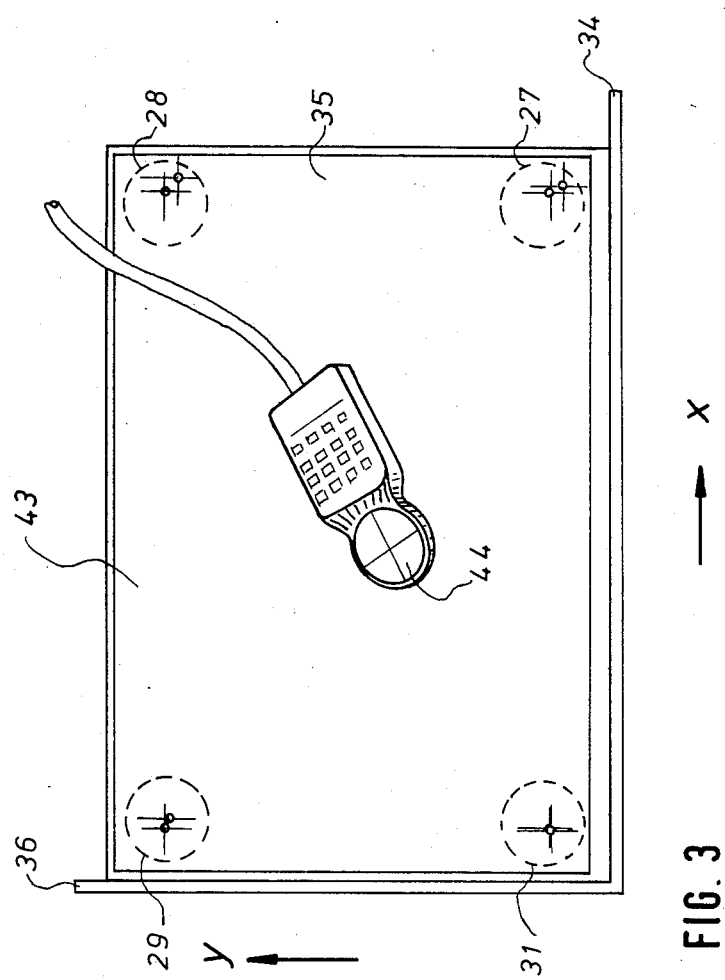
FIG. 3 is a schematic view of a digitalization board showing the sheet to be evaluated and the use of a digitilizer for determining the position of the color mark edges of the sheet to be evaluated.

Referring now to FIG. 3, instead of the passive coordinate system drawn on the measuring table surface as seen in FIG. 2, an active digitizer surface 43, as is disclosed in German published unexamined patent application No. 29 39 388, can be used. A capacitive thread cross signal pickup assembly 44 cooperates with digitizer surface 43, as may also be seen in the German published unexamined patent application No. 29 39 388. The sheet 35 to be evaluated is placed against straight edges 34 and 36. The thread cross signal pickup device 44 is placed on top of the points of intersection, of the individual register marks of, for example the register mark pairs 27 and 31 and the measured values fed into a computer. The computer then calculates, as described above, the nominal value settings of the adjustment means 8, 9, 16, 17, 19, 21 and their adjustment is effected as described above.

Turning now to FIG. 4, there may be seen yet another assembly for use as a register system in accordance with the present invention. A measuring table 46 carries an upper horizontal guide bar 47 and a lower horizontal guide bar 48. These guide bars 47 and 48 are positioned parallel to each other and form support rails for a horizontally shiftable carriage 49. This carriage 49 carries a vertically shiftable camera carriage 51. A generally known color video measuring camera 52 is secured to the camera carriage 51 at a distance above the surface of table 46. Horizontal and vertical straight edges 34 and 36, respectively are also secured to the measuring table 46. Movements of the carriage 49 in the X-direction and movement of the camera carriage 51 in the Y-direction may be converted into digital impulses in a generally conventional manner and may be fed into a computer and stored there.

The electronic measuring camera 52 is passed over the register mark pairs such as 31 and 27 to be measured in turn and measured X and Y positionings are stored. An enlarged image of both of several register mark pairs, such as 27 and 31 to be measured are indicated side by side on a color monitor 53. Subsequently, the two different colored register mark intersection points each of the register marks in each of the pairs 27 and 31 are measured by means of a light stylus of a known color video measuring camera-measuring system such as the DAI NIPPON "TELECURSOR" and the coordinate intersection points of the two reference register marks such as the first color of the register mark pair 27 and 31 and those of the second color of the register mark pairs 27 and 31 to be adjusted are stored in the computer. The computer then calculates again, as already described above, the adjustment values for the position of the printing plate for the second color. Instead of a light stylus assembly, as shown in the "TELECURSOR" system, it would also be possible to use a track-ball or a control ball 54 and to position the register marks of the reference color and of the second and possibly further colors into coincidence on the screen and to then feed the values to a computer.

As with the previously discussed embodiments, adjustment of the various adjustment means 8, 9, 16, 17, 19 and 21 may be accomplished manually or by suitable motor and control assemblies. In either instance, these adjustment means will be adjusted in accordance with the computer generated information to more accurately align the second and possibly other color printing plates with the first, reference color plate so that the various colors are in as near to perfect registry as possible.

All of the adjustment values generated by the computer may be displaced on screen or may be fed directly to the motor drives for the controls. Additionally, these values may be printed out by a separate printer (not shown) so that a permanent record of the corrective values may be kept.

It will be understood that the various register pairs 27, 28, 29, and 31 indicate separate groups of register marks which belong together. Although they have been referred to as pairs, this is somewhat of a misnomer as, for example where three colors are being used, each register pair will actually consist of three register marks. It will further be understood that miniature color CCD cameras may also find use in the present assembly as video measuring changes.

As will be apparent to one of skill in the art, these above changes in number of register pairs, types of video cameras and other such changes in, for example, the number and type of printing plates and presses and the like may be made without departing from the true spirit and scope of the present invention which is accordingly to be limited only by the following claims:

What is claimed is:

1. A method for correcting register errors by adjusting the position of at least one flexible individual color printing plate on a plate cylinder of a multi-color printing machine comprising:
   securing each said individual color printing plate on a plate cylinder in the multi-color printing machine;
   determining starting points of adjusting means including first and second spacially fixed turning poles of a front plate clamping and tensioning bar from a printing surface starting line on each said individual color printing plate;
   determining a distance between said first and second tuning poles;
   determining a distance between spaced first and second front register marks on each said individual color printing plates;
   determining a distance between said first front register mark and a first rear register mark and a first rear register mark on each said individual color printing plates;
   printing a multi-color sheet having spaced sets of register marks with each of said register marks in each set of register marks corresponding to one of said colors printed on said multi-color sheet;
   positioning said printed sheet on a measuring table;
   determining positional coordinates for each of said spaced sets of register marks;
   determining positional differences between each of said register marks in each of said spaced sets of register marks;
   determining the nominal settings of said adjusting means to position each said individual color printing plate on said multi-color printing machine in registry from said positional coordinates, said positional differences and said starting points of said first and second spacially fixed turning poles, and
   operating said adjusting means to position each said individual color printing plate in said registered position.

2. An apparatus for measuring registration errors in a multi-color printing machine having at least two printing plate cylinders which each carry at least one individual color printing plate, each of which has a plurality of register marks, said apparatus comprising:
 a measuring table for receiving a multi-color printed sheet from said multi-color printing machine, said table having means for determining the X and Y positional coordinates for at least one set of said register marks on said multi-color sheet; and
 means for determining the positional differences between each of said register marks in said at least one set of said register marks on said multi-color sheet.

3. The apparatus of claim 2 wherein said means for determining the positional differences between each of said register marks is said at least one set of said register marks in an electronic color video measuring camera system.

4. The apparatus of claim 2 wherein said means for determining the X and Y positional coordinates for said at least one set of register marks is a digitizer surface and a thread cross signal pickup.

5. The apparatus of claim 2 wherein said means for determining the X and Y positional coordinates for said at least one set of register marks is a digitizer surface and a light stylus.

6. The apparatus of claim 2 wherein said means for determining the X and Y positional coordinates for said at least one set of register marks is an electronic color video measuring camera movable in said X and Y direction and mounted over said measuring table.

7. The apparatus of claim 2 wherein said means for determining X and Y positional coordinates for said at least one set of said register marks on said measuring table are fixed horizontal and vertical straight edges, wherein a horizontal coordinate bar including a horizontal scale is associated with said horizontal straight edge, and wherein a vertical coordinate bar including a vertical scale is associated with said vertical straight edge.

* * * * *